United States Patent [19]
Simpson

[11] Patent Number: 6,152,026
[45] Date of Patent: Nov. 28, 2000

[54] SYSTEM FOR BALING FARM PRODUCTS

[76] Inventor: T. Whipple Simpson, Rte. 2, Box 247-F, Cochran, Ga. 31014

[21] Appl. No.: 09/327,753

[22] Filed: Jun. 7, 1999

Related U.S. Application Data

[60] Provisional application No. 60/129,616, Apr. 16, 1999.

[51] Int. Cl.[7] ............................ A01F 15/04; A01F 15/10; B30B 9/30
[52] U.S. Cl. ........................ 100/70 R; 100/102; 100/189; 414/24.6
[58] Field of Search ..................... 100/70 R, 96, 100/97, 102, 142, 189; 414/24.6

[56] References Cited

U.S. PATENT DOCUMENTS

| | | | |
|---|---|---|---|
| 2,147,469 | 2/1939 | Tallman | 100/189 |
| 3,353,947 | 11/1967 | Kramer | 100/97 |
| 3,926,378 | 12/1975 | Ryan . | |
| 4,034,920 | 7/1977 | Bradley . | |
| 4,266,899 | 5/1981 | Skeem . | |
| 4,498,830 | 2/1985 | Seymour et al. . | |
| 4,741,656 | 5/1988 | Bishop . | |
| 4,982,658 | 1/1991 | Knudson . | |
| 5,010,809 | 4/1991 | Williams . | |
| 5,209,413 | 5/1993 | Dwyer et al. . | |
| 5,377,479 | 1/1995 | Wilstrand et al. . | |
| 5,377,481 | 1/1995 | Sibley et al. . | |
| 5,390,777 | 2/1995 | Gage . | |
| 5,479,766 | 1/1996 | Ransom . | |
| 5,515,961 | 5/1996 | Murphy . | |
| 5,540,144 | 7/1996 | Schrag et al. . | |
| 5,661,961 | 9/1997 | Westhoff et al. . | |
| 5,687,643 | 11/1997 | Felts et al. . | |
| 5,752,374 | 5/1998 | Allworden et al. | 100/189 |
| 5,833,043 | 11/1998 | Schmidgall et al. . | |
| 5,927,188 | 7/1999 | Gombos et al. | 100/189 |

*Primary Examiner*—Stephen F. Gerrity
*Attorney, Agent, or Firm*—Richard C. McComas; Patent Focus, Inc.

[57] ABSTRACT

A farm product baling system for transforming large rolls of baled farm product into smaller substantiality rectangular sized bales of farm products. The farm product baling system preferably incorporates a first conveyor thrasher subsystem connected to a standard type baler in such a way as to enable the first conveyor thrasher subsystem to convey and thrash the farm product prior to being baled by the standard baler. A first receiving conveyor subsystem may, if desired, be operatively connected to one end of the first conveyor thrasher subsystem in such a way as to facilitate the unrolling of the large baled farm products to the first conveyor thrasher subsystem. A mirror image of the first receiving conveyor subsystem and the first conveyor thrasher subsystem may, if desired, be operatively added to the farm product baling system to further increase volume of production in transforming large rolls of baled farm products into smaller substantiality rectangular sized bales of farm products.

36 Claims, 14 Drawing Sheets

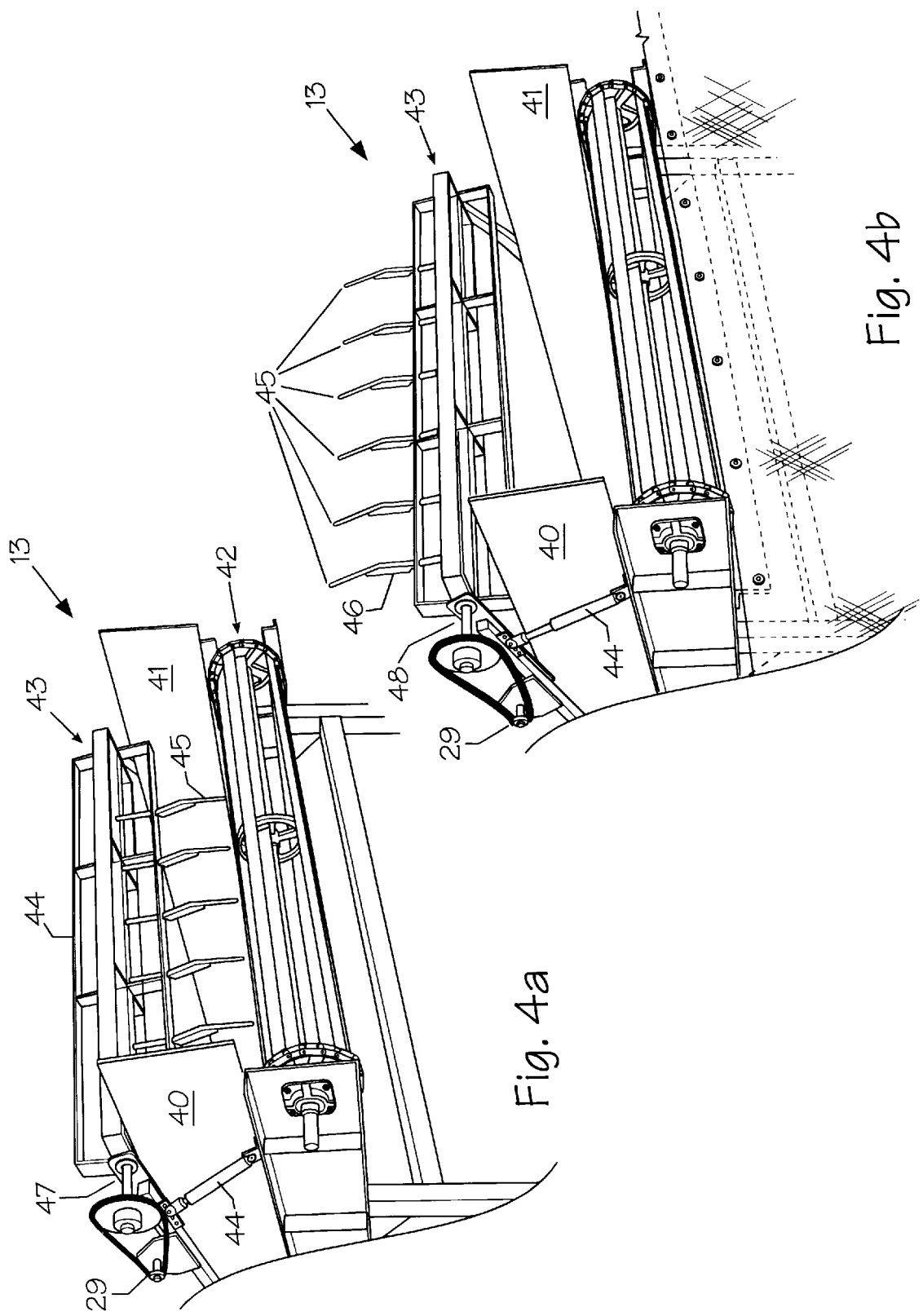

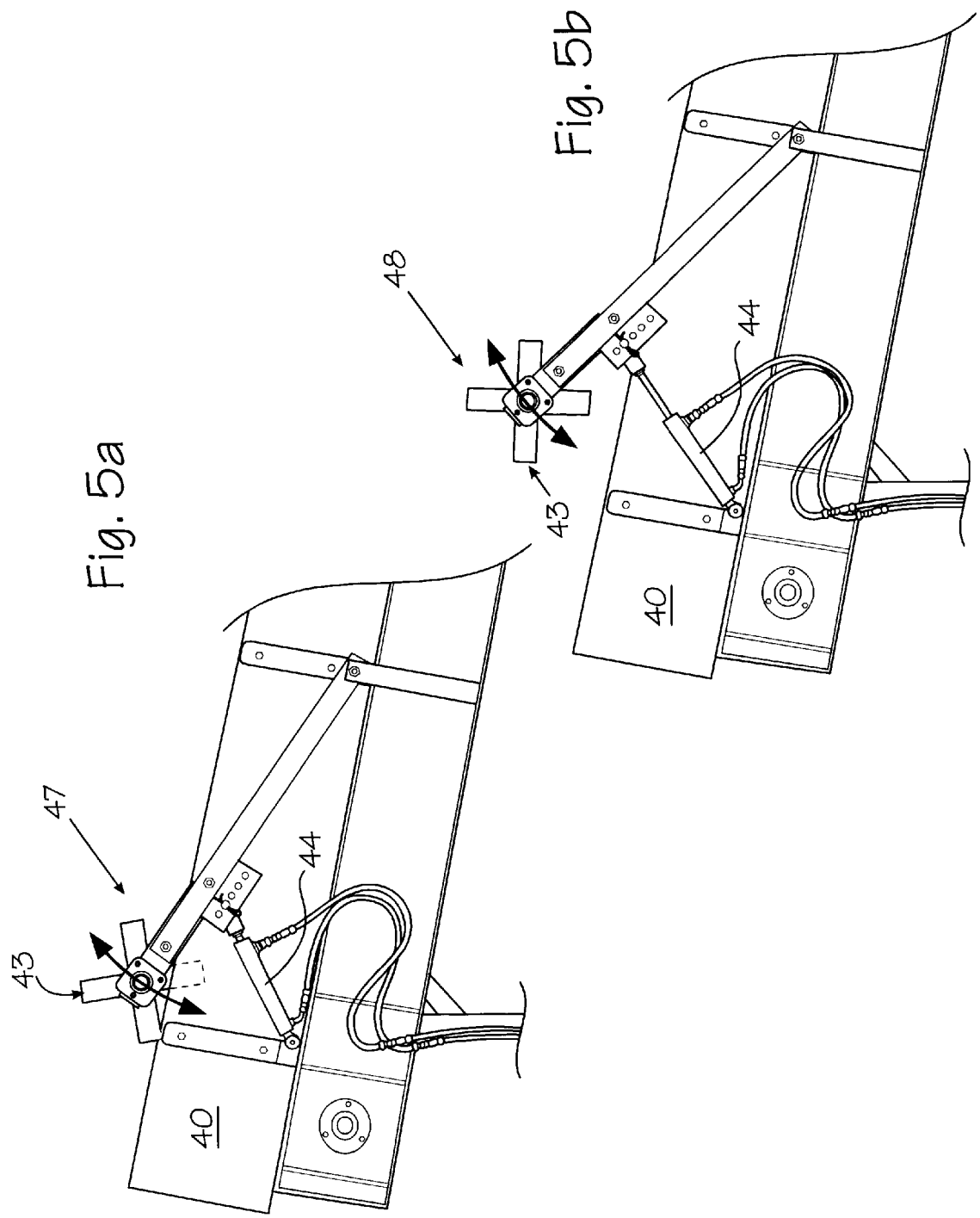

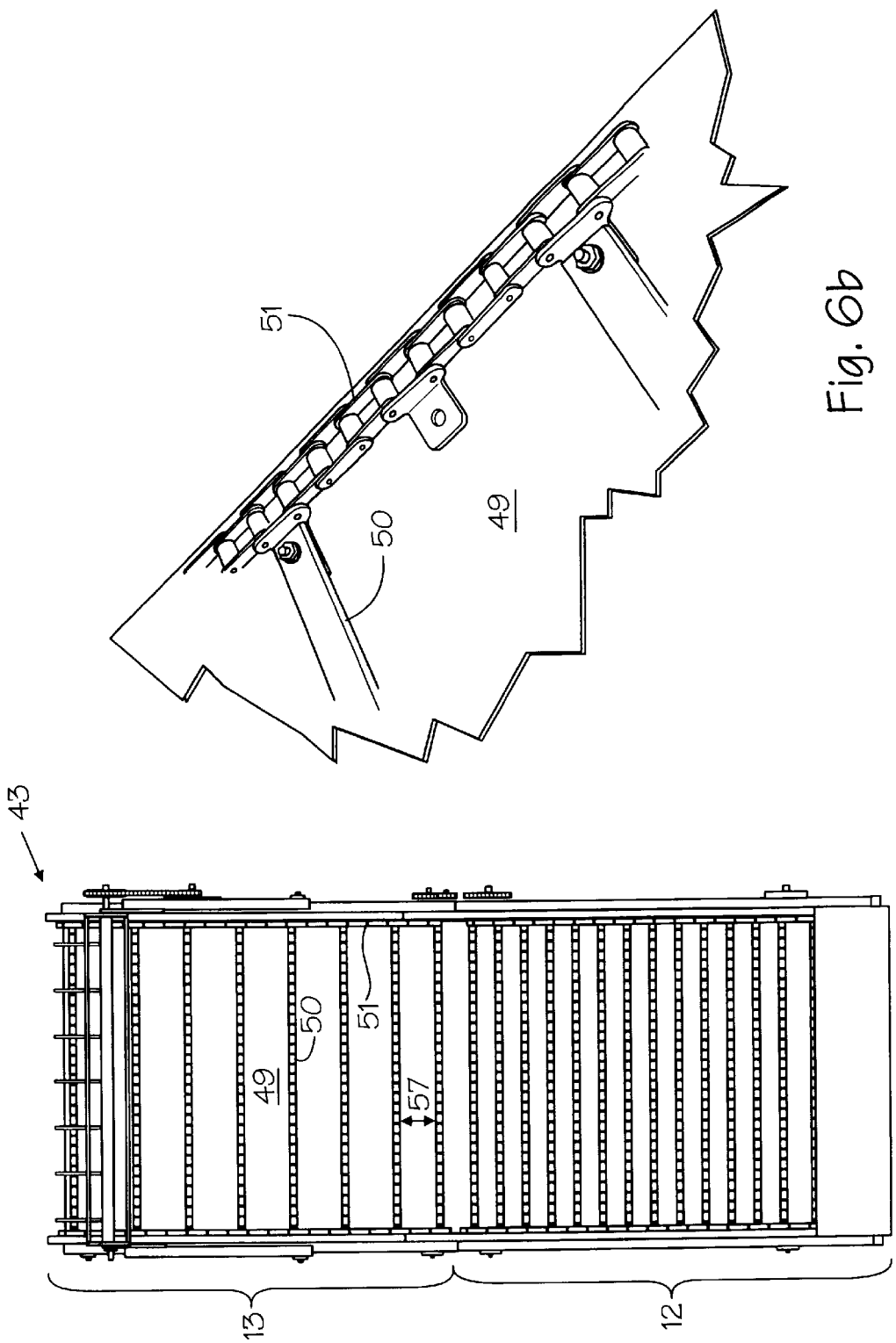

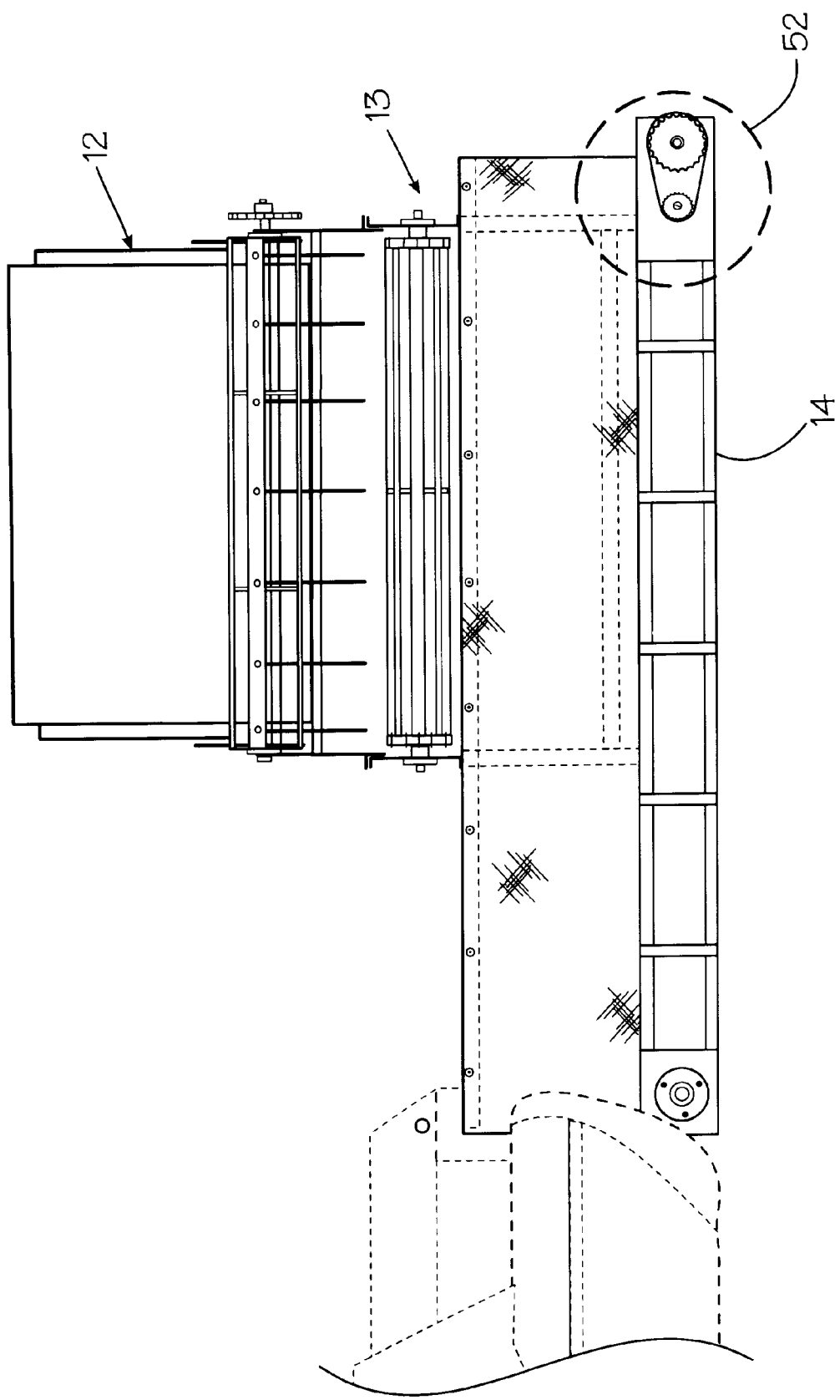

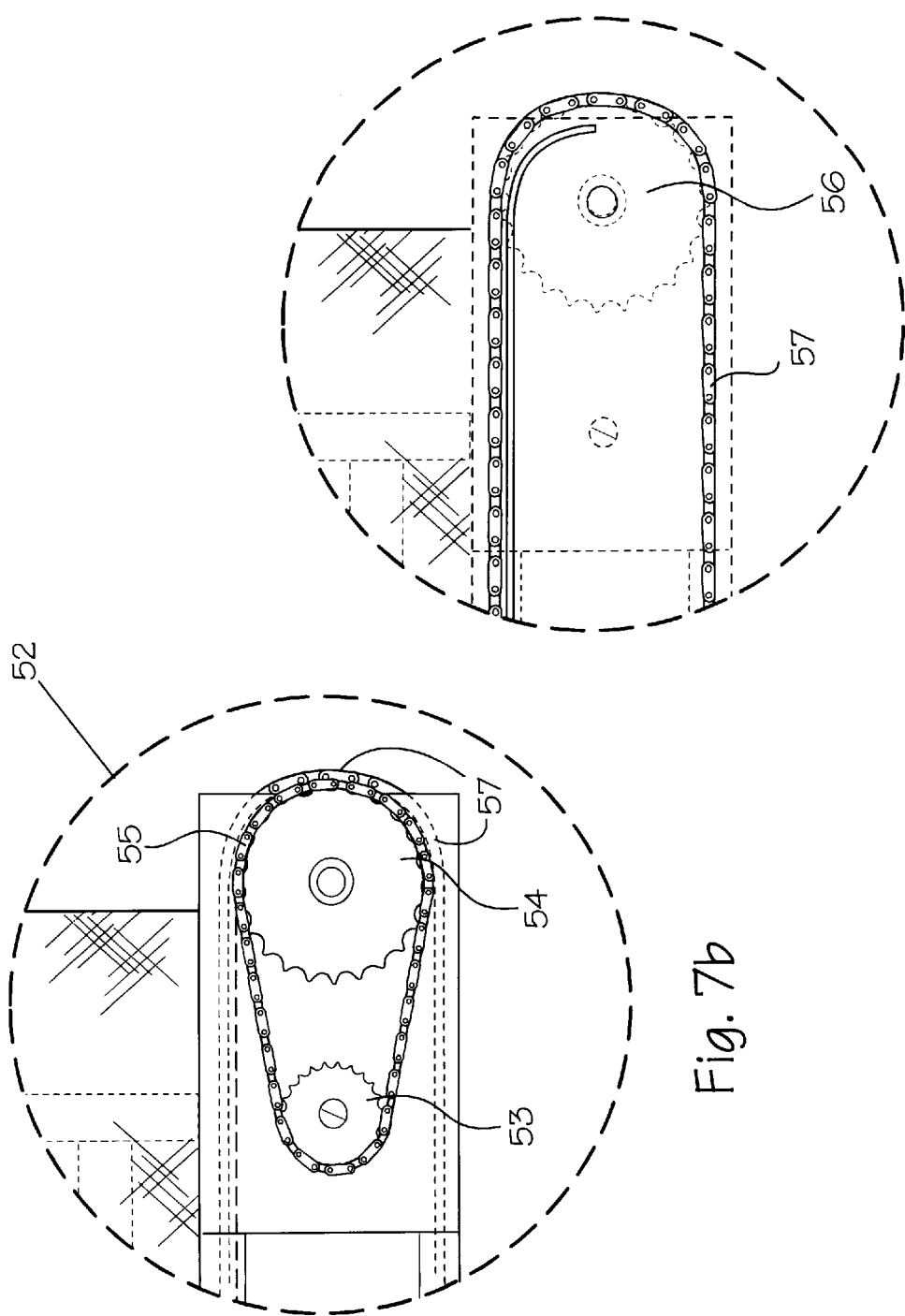

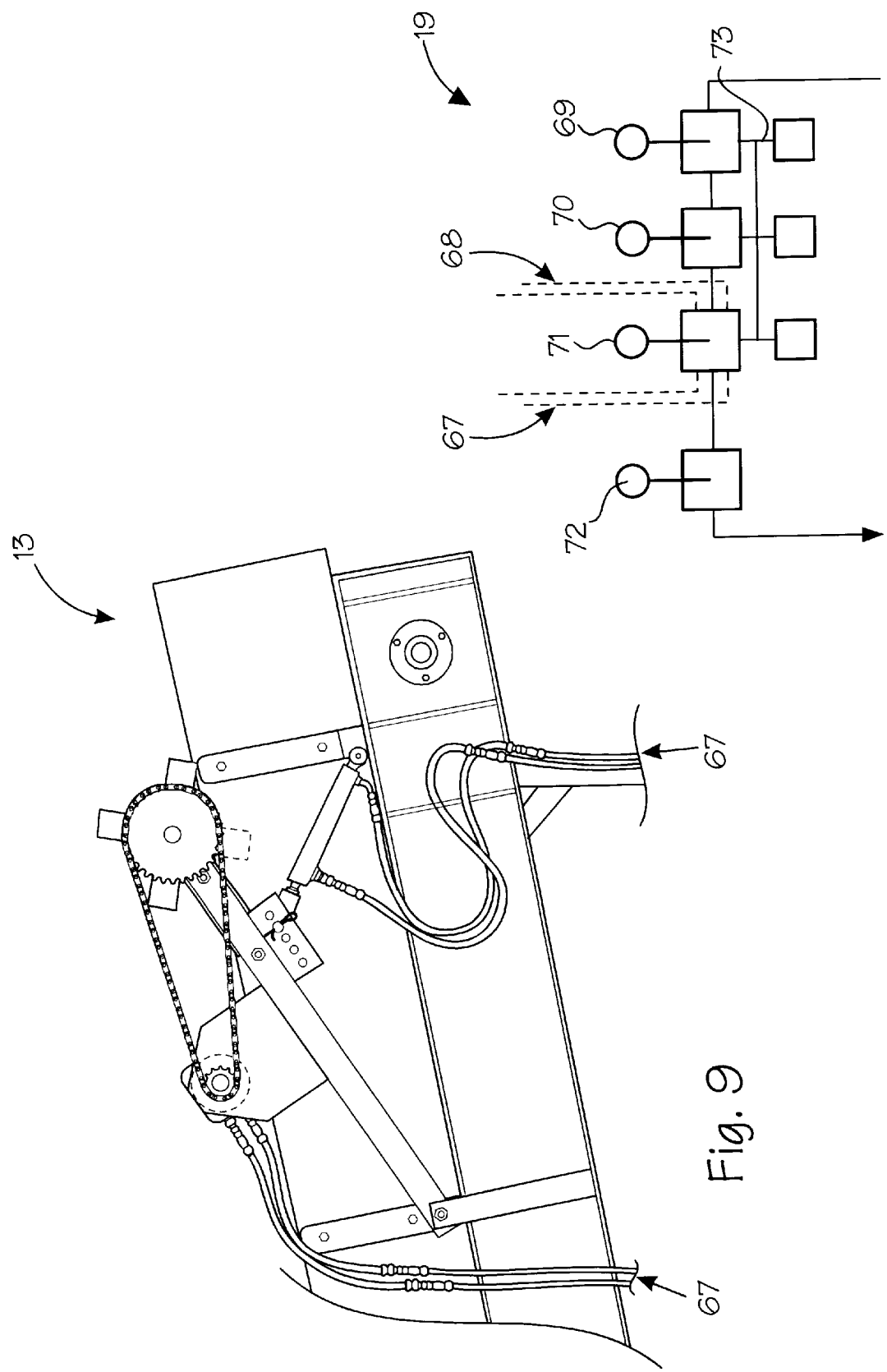

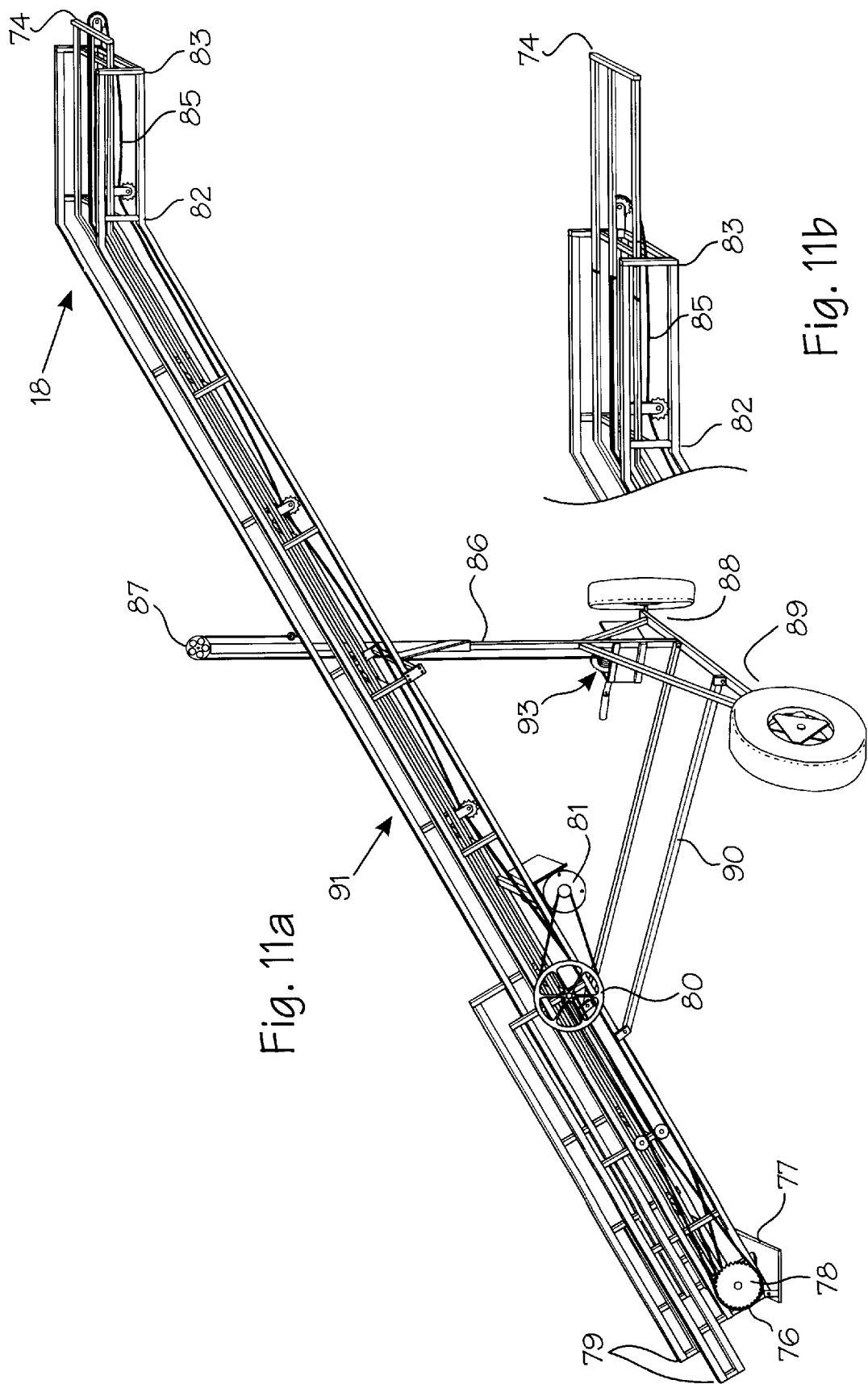

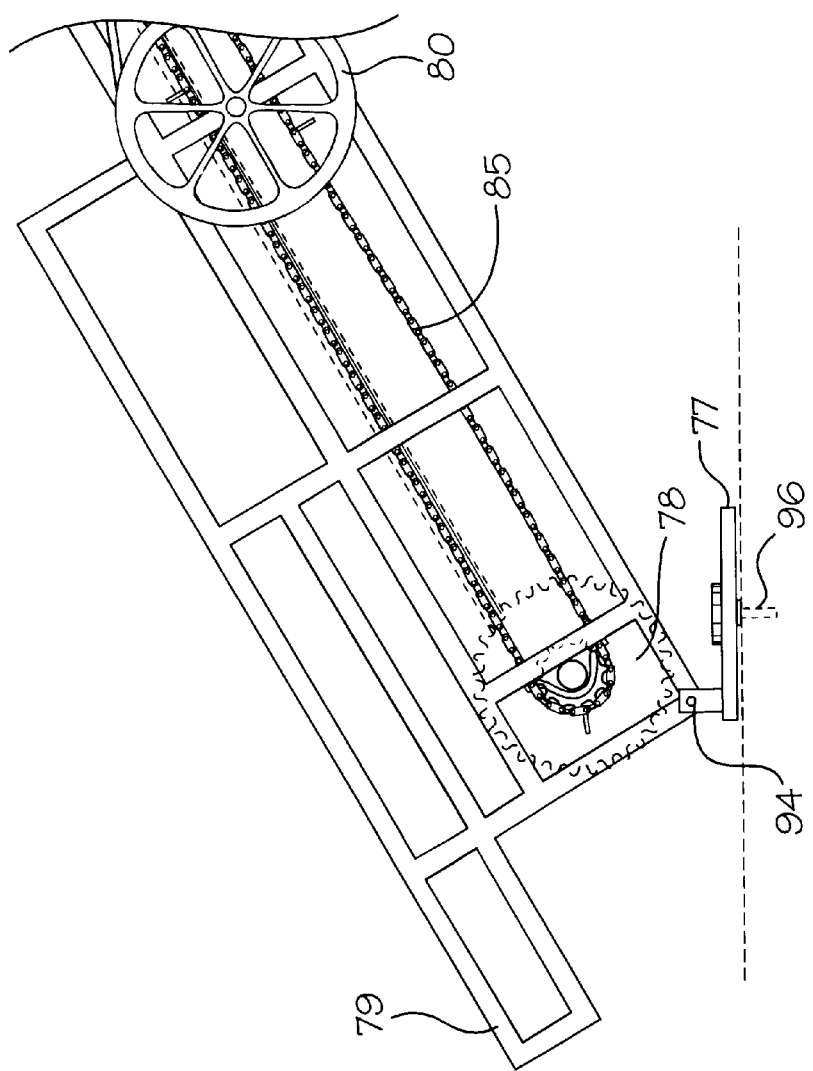
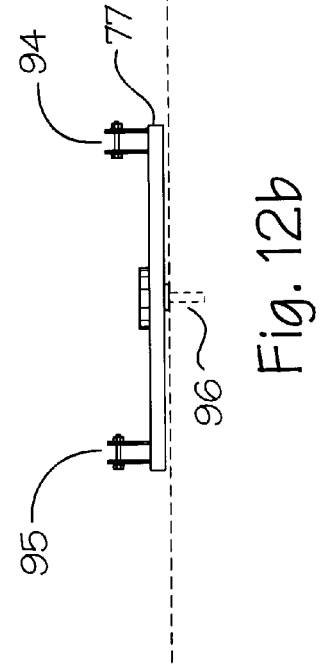
Fig. 12a
Fig. 12b

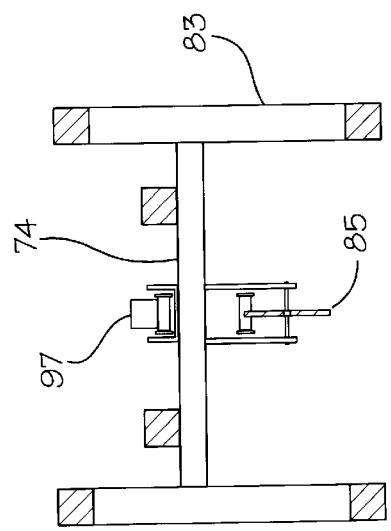
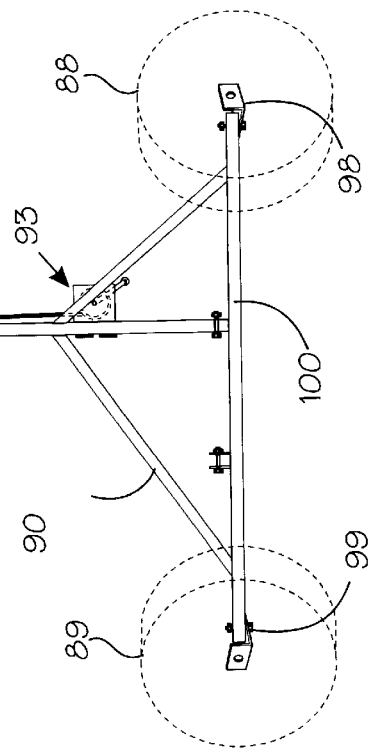

SYSTEM FOR BALING FARM PRODUCTS

This applications claims the benefit of U.S. Provisional Application No. 60/129,616 filed on Apr. 16, 1999.

FIELD OF THE INVENTION

The invention relates, in general, to a system for baling farm products. In particular the invention relates to a system for transforming large rolled bales of farm products into substantially smaller rectangular sized bales of farm products. More particularly the invention relates to a plurality of conveyors and thrashing mechanisms working in concert with a plurality of hydraulic motors under the control of an operator to transform large rolled bales of farm products into substantially smaller rectangular sized bales of farm products.

BACKGROUND OF THE INVENTION

The baling of farm products along with farming has changed over the years. At the turn of century the number of farmers or farm workers, as compared to the number of industry or factory workers, was quite large. There was a large segment of the labor force actively engaged in farming and many were engaged in the baling of farm products. Farming was labor intensive and there was a large labor force available to bale farm products. The cost of labor was relatively low when compared to the cost of the baled farm product. As the economy expanded the need for factory workers increased. Competing resources drew from the large farm labor pool thus draining the available labor from the labor pool.

As the labor pool shrank, the need to mechanize farming increased to provide the same or increased productivity with less direct farm labor. One solution to mechanize farming is to store farm products in a compact state. For example large volumes of farm product, such as hay, may be harvested directly from the windrows in the fields. The large volumes of hay are rolled in such a way as to be tightly compacted. The hay may then be stored and later unrolled and rebaled into a more workable or convenient bale size. The economies of scale in this approach are self-evident. The bigger the rolls of hay the lower the labor cost of individual rolls.

To preserve the economies of scale, the unrolling and rebaling of the farm product must be done by a labor saving rebaling machine. Attempts in the past have been made to preserve the economies of scale by unrolling the farm product into a hopper. The hopper would then feed the farm product into a chamber. The chamber would grind and mix the farm product prior to its being formed into square or substantially rectangular sized bales. The caveat to this approach is that not all rolled bales of farm product are rolled with the same consistency. Farm products may be harvested at various times during the harvest season and under various climatic conditions. The rolled bales of farm product may be in storage for various lengths of time before being rebated. The rolled bales of various consistencies may stall or choke the mixer or grinder thus requiring labor to unstall the machinery involved. This effort is high maintenance and does not produce the economies of scale desired in transforming rolled bales of farm product into substantially rectangular sized bales.

Other attempts to resolve the problems of efficiently transforming large rolled bales of farm products into smaller bales include the additions of various chambers in the baling process. The chambers have various types of augers, rollers and thrashers that attempt to separate the farm product prior to compacting it into smaller bales. The caveat to this approach is the augers, rollers, and thrashers tend to be unidirectional. The variation in rolled bale consistency is not accommodated. If the consistency of the rolled bale is such that it is tightly wound or wet, the unidirection of the augers, rollers, and thrashers do not separate the farm product. The unseparated farm product generally has to be manually removed or manually separated in the chamber before the processing of the rolled bales may continue.

It would be desirable to have a system for baling farm products that would allow a minimum expenditure of labor to operate and produce smaller baled farm products from larger baled farm products. The system would be able to accommodate various consistencies of large baled farm products i.e., tightly wrapped bales, loosely wrapped bales, or wet and matted bales of farm product. The system would also provide multidirectional capabilities to enable an operator of the system to maneuver the unrolling of the larger bales of farm product in the forward or reverse direction. The aerating and thrashing of the farm product would be under operator control thus enabling the operator to accommodate for varying degrees of consistency (as discussed above) disposed within a particular large rolled bale of farm product. The transforming of large rolled bales of farm products into smaller substantially rectangular sized bales of farm products would no longer rely on labor intensive methods to unroll or unfurl the larger baled farm products or the mechanisms that are primarily designed to grind and compact rather than separate and aerate.

SUMMARY OF THE INVENTION

The farming industry is well aware of the importance of containing cost in the production of farm products. Cost containment and the management of farm labor may very well be the core elements in making a successful harvest. Farmers have a multitude of challenges and adversities facing them every day. Those adversities and challenges range from weather, diminishing labor pool, to equipment malfunction, and many more too numerous to mention.

The common thread that runs through all of these challenges and adversities is cost containment and management of farm labor. The challenges and adversities the farmer experiences in the course of a season generally determine whether the farmer will be in business the following season. The management of farm labor is seasonal. Farm labor generally peaks one or more times during the year, during the planting and/or harvesting of farm products. The harvesting of farm products generally occurs in a short time period and the amassing of the farm labor to harvest crops all at the same time is not practical or possible. The problem of course is cost containment and management of farm labor.

The present invention provides a solution to cost containment and management of farm labor after the harvest season. The present invention provides the farmer with a means to very quickly process farm products that have been harvested in bulk and stored at various times during the year. An example of harvesting a farm product in bulk is the well-known process of harvesting hay by rolling it into large bales rather than into smaller more traditional size bales. The economies of scale are self evident. The harvesting of farm products in bulk reduces the overall cost of harvesting and reduces the dependency on great numbers of farm labors, i.e., cost containment and management of farm labor.

The present invention transforms bulk farm products like large rolls of hay that were stored or recently harvested into more suitably sized bales. The present invention is a farm product bailing system. The farm product bailing system is generally composed of a plurality of subsystems and a standard type baler that has been used by farms for generations. The first subsystem is a conveyor thrasher. As the name implies the subsystem comprises, in part, a conveyor assembly and a thrasher assembly. The first conveyor thrasher subsystem is connected to the standard baler in such a way as to enable the farm product to be loaded into the conveyor assembly which conveys the farm product to the thrasher assembly. The thrasher assembly, under an operator control, thrashes the farm product prior to its being baled by the standard baler.

The conveyor assembly has at least one slat that is attached to a chain drive mechanism. These slats are generally positioned at a right angle to the direction of travel of the farm product as the large bulk farm product is being unrolled. The chain drive mechanism, under operator control, can be commanded to move in the forward or reverse direction depending on the needs of unrolling the farm product. The thrasher assembly is able to move in a forward or reverse direction independent of the direction of travel of the conveyor assembly. The thrasher assembly may, if desired, move up or down depending on the volume of farm product that is approaching the thrasher assembly. The operator, positioned at the controls of the first conveyor thrasher subsystem, commands and controls all aspects of the transformation of large bulk farm product into suitably sized bales of farm product.

A platform conveyor subsystem may, if desired, be positioned intermediate the first conveyor thrasher subsystem and the standard baler. The platform conveyor subsystem is connected to the first conveyor thrasher subsystem in such a way as to enable the thrashed farm product to be gravity fed into one end of the platform conveyor. The other end of the platform conveyor is connected to the standard baler in such away as to enable the farm product to be fed thereto.

The platform conveyor subsystem, like the first conveyor thrasher subsystem, has at least one slat connected to a chain drive mechanism. These slats are generally positioned at a right angle to the direction of travel of the farm product as the large bulk farm product is being unrolled. This chain drive mechanism, under operator control, can be commanded to move in the forward or reverse direction depending on the needs of unrolling the farm product.

A first receiving conveyor subsystem may, if desired, be connected to the first conveyor thrasher subsystem in such a way as to enable the processing or loading of the farm product into the first conveyor thrasher subsystem. The first receiving conveyor, like the first conveyor thrasher and the platform conveyor subsystems, is under operator control. The first receiving conveyor subsystem receives independent control commands from the operator; ergo, the unrolling or processing of the farm product is independent from the actions of the first conveyor thrasher and platform conveyor subsystems.

The first receiving conveyor subsystem, like the first conveyor thrasher and platform subsystems, have at least one slat connected to a chain drive mechanism. These slats are generally positioned at a right angle to the direction of travel of the farm product as the large bulk farm product is being unrolled. This chain drive mechanism, under operator control, can be commanded to move in the forward or reverse direction depending on the needs of unrolling the farm product.

The present invention has the capability of supporting multiple subsystems. If desired a second receiving conveyor subsystem may be connected to a second conveyor thrasher subsystem and the second conveyor thrasher subsystem may be connected to the platform conveyor subsystem. The operator may, if desired, switch the command and control of the first receiving conveyor and first conveyor thrasher subsystems to the second receiving conveyor and second conveyor thrasher subsystems using the same control levers as used to control the first receiving conveyor and first conveyor thrasher subsystems. The switching of the command and control between the various subsystems is facilitated by an independent lever. In one position the lever enables the operator to command and control the first receiving conveyor and first conveyor thrasher subsystems and in an alternate position to command and control the second receiving conveyor and second conveyor thrasher subsystems.

The present invention may, if desired, have a re-circulating system that receives unprocessed farm product ejected from the aforementioned subsystems. The re-circulating system returns the unprocessed farm product to the platform conveyor subsystem so that it may be properly processed and baled by the standard baler. The re-circulating system may, if desired, have at least one air blower or vacuum pump that moves or transports the unprocessed farm product to the platform conveyor subsystem.

The present invention may, if desired, have a loading conveyor subsystem. The loading conveyor subsystem is adjacently connected to the standard baler in such away as to enable the loading conveyor subsystem to arcuately pivot about the standard baler. The loading conveyor subsystem receives the baled farm product from the standard baler and conveys it to awaiting transportation. The loading conveyor subsystem has connected at one end a telescoping extension mechanism that facilitates the loading of the baled farm product onto the awaiting transportation.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which:

FIG. 4b illustrates a perspective view of the thrasher subsystem of FIG. 4a with the thrasher in position two, FIG. 5a illustrates a side view of the thrasher subsystem of FIG. 4a with the thrasher in position one, FIG. 5b illustrates a side view of the thrasher subsystem of FIG. 4b with the thrasher in position two, FIG. 6a illustrates a top view of the conveyor subsystem of FIG. 1a, FIG. 6b illustrates a sectional perspective view of the chain drive of FIG. 6a, FIG. 7a illustrates a side view of the conveyor subsystem of FIG. 6a, FIG. 7b illustrates a side view of the chain drive of FIG. 7a, FIG. 7c illustrates a side view of the conveyor subsystem attached to the chain drive of FIG. 7b, FIG. 11a illustrates a perspective view of the conveyor subsystem of FIG. 1a, FIG. 11b illustrates a perspective sectional view of the end portion of the conveyor subsystem of FIG. 11a, FIG. 12a illustrates a sectional side view of the base assembly of FIG. 11a, FIG. 12b illustrates an end view of the pivotal connection to the base assembly of FIG. 12a, FIG. 13 illustrates an end view of the conveyor subsystem of FIG. 11a, FIG. 14 illustrates a sectional view of the chain drive assembly of FIG. 13.

DETAILED DESCRIPTION OF THE PREFERRED EMBODIMENT OF THE PRESENT INVENTION

Figure 1A:
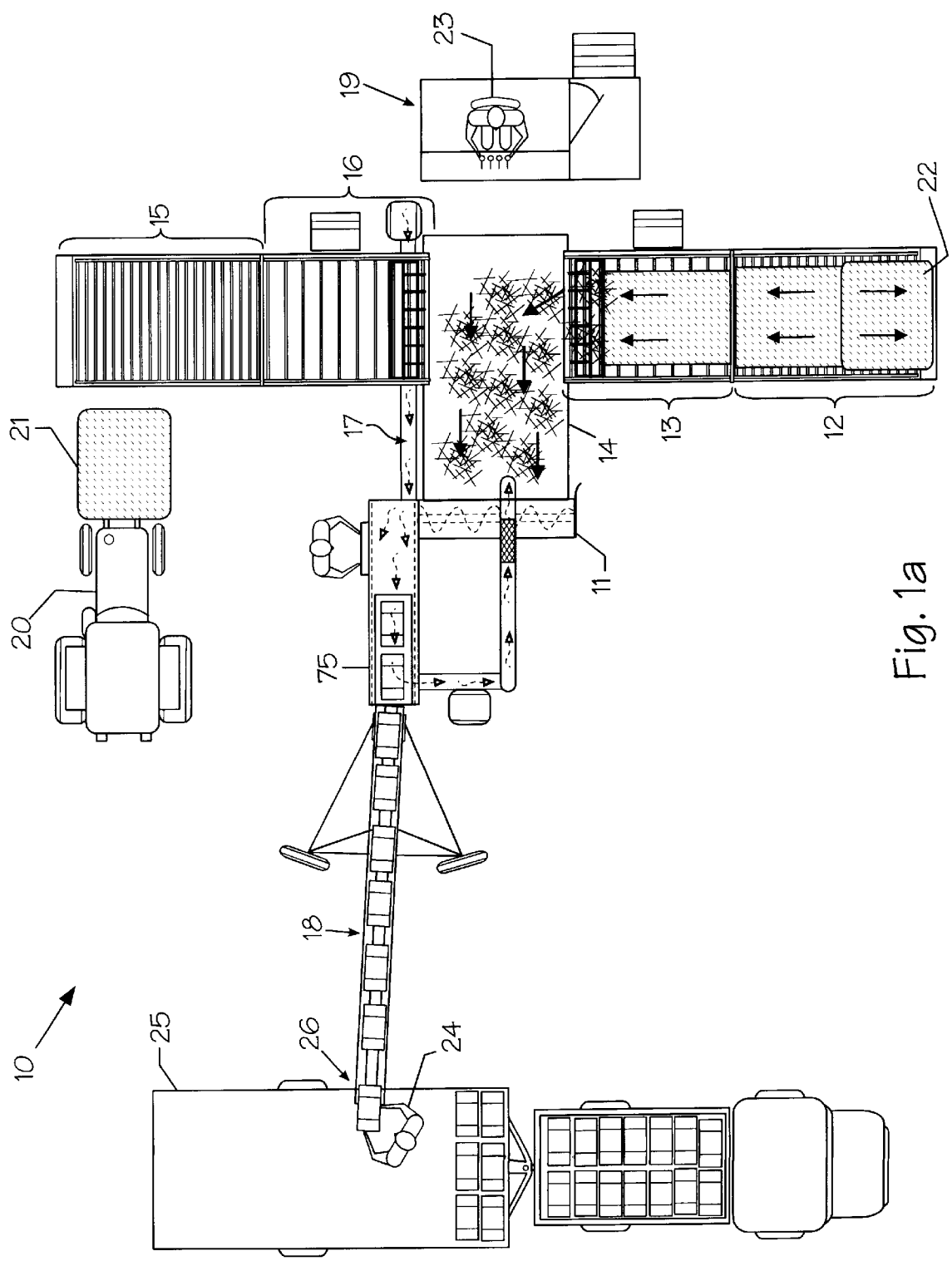
FIG. 1a illustrates a top level systems diagram of the preferred embodiment of the present invention with the conveyor subsystem in position one.

Before describing in detail the particular improved system for baling farm products in accordance with the present invention, it should be observed that the invention resides primarily in a novel structural combination of conventional farm equipment, discrete subsystems or subassembly components, associated control of the aforementioned farm equipment and components, and not in the particular detailed configuration thereof. Accordingly, the structure, command, control, and arrangement of these conventional components and subassemblies have, for the most part, been illustrated in the drawings by readily understandable diagram representations and schematic diagrams. The drawings show only those specific details that are pertinent to the present invention in order not to obscure the disclosure with structural details which will be readily apparent to those skilled in the art having the benefit of the description herein. For example, a farm product baling machine or hay baler 11, FIG. 1 has numerous connections to the present invention 10. Various portions of the farm product baler 11's connections to the present invention have been simplified in order to emphasize those portions that are most pertinent to the invention. Thus, the top level system diagram and schematic diagram illustrations of the Figures do not necessarily represent the mechanical structural arrangement of the exemplary system, and are primarily intended to illustrate major hardware structural components of the system in a convenient functional grouping whereby the present invention may be more readily understood.

AN OVERVIEW OF THE PRESENT INVENTION

The preferred embodiment of the present invention 10 is a system for baling farm products. Any type of balable farm product may be used in conjunction with the present invention 10. An example of a farm product is a forage plant cut and dried for animal feed commonly referred to as hay. The hay, in this example, has been previously rolled into large storage bales that require baling into smaller bales. The baling system of the present invention 10 may, if desired, be composed of any number of individual subsystems or subassemblies. If desired the present invention 10 may be expanded into multipliable systems for baling farm products, all systems being controlled from one central control station 19. The present invention 10 may, if desired, be mounted onto any surface that allows the normal operation of the present invention 10. The present invention 10 may, for example, be located in the fields where the harvested of the farm products can be baled.

Figure 1B:
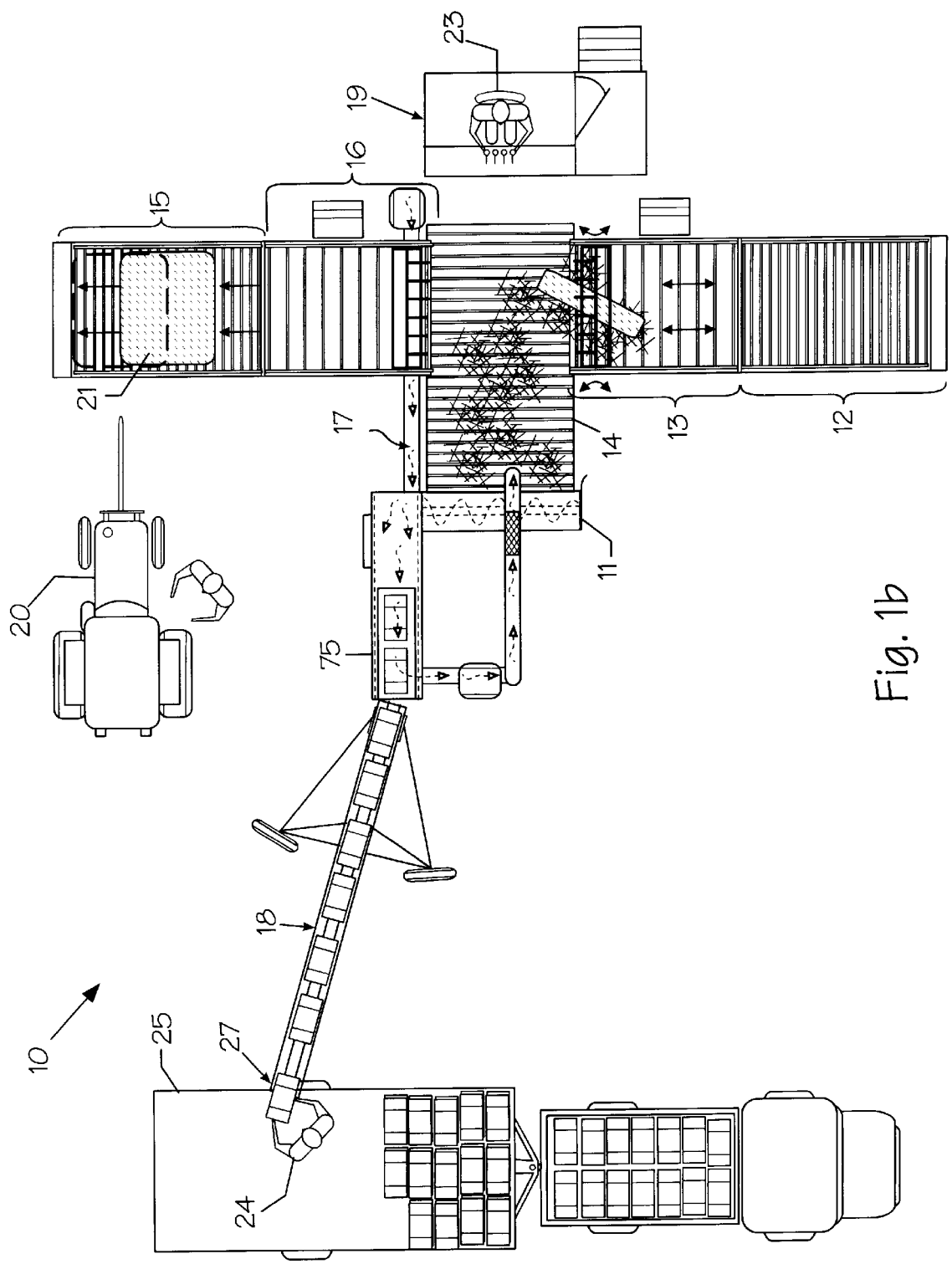
FIG. 1b illustrates a top level systems diagram of FIG. 1 with the conveyor subsystem in position two.

The farm product baling system of the present invention 10 has a first receiving conveyor subsystem 12, FIG. 1a. The first receiving conveyor subsystem 12 is mechanically connected to a first conveyor and thrasher subsystem 13. The first conveyor and thrasher subsystem 13 is mechanically connected to the platform conveyor subsystem 14. The platform conveyor 14 is positioned in line with a standard baling machine 11. If desired the standard baling machine 11 may be operationally connected to the first conveyor thrasher subsystem 13. The standard baling machine 11 bales the farm product into suitable size bales for storing or transporting via any convenient vehicle such as truck 25.

A MORE DETAILED DISCUSSION OF THE PRESENT INVENTION

The First Receiving Conveyor Subsystem

Figure 2A:
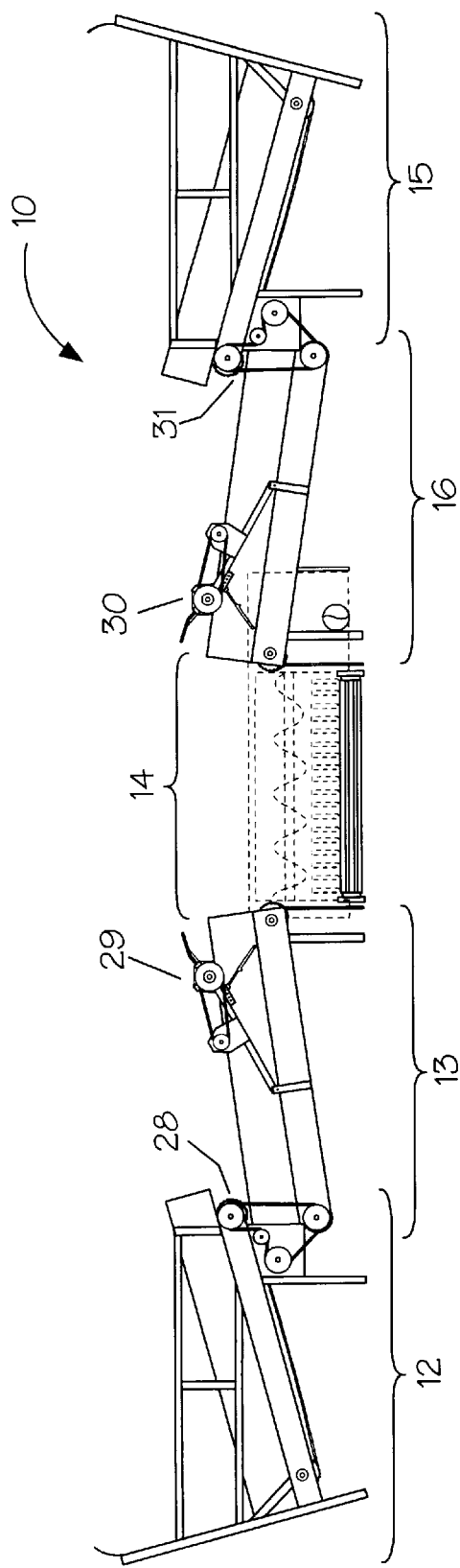
FIG. 2a illustrates a side view diagram of FIG. 1a, FIG. 2b illustrates an operational side view diagram of FIG. 2a, FIG. 3 illustrates a side view of the blower subsystem of FIG. 1a, FIG. 4a illustrates a perspective view of the thrasher subsystem of FIG. 1a with the thrasher in position one.

The first receiving conveyor subsystem 12, FIG. 2a comprises a frame mounted conveyor 107. The frame mounted conveyor 107 has a plurality of depending ground engaging legs 100, 101, 102, and 103 that support the weight of the frame mounted conveyor 107. An upright back plane 106 is mounted to one end of the frame mounted conveyor 107 in such a way as to allow the back plane 106 to extend upward from the frame 107. A pair of supporting side rails 105 are mounted to the upright back plane 106 and the frame mounted conveyor 107. The pair of supporting side rails 105 provides additional structural support to the mechanical connection between the upright back plane 106 and the frame mounted conveyor 107. A pair of upright sidewalls 104 may, if desired, be secured on the frame mounted conveyor 107 adjacent to the side rails 105 and connecting to the upright back plane 106. The sidewalls 104 facilitate and contain the farm product 22 when the present invention 10 is in operation. The conveyor portion of the frame mounted conveyor 107 is a continuous chain driven conveyor that has a plurality of slats 50, FIG. 1b, mounted parallel to the direction of travel of the conveyor.

The first receiving conveyor subsystem 12 may be fabricated from any convenient material that supports the operation of the present invention 10. If desired the first receiving conveyor subsystem 12 may be free standing on support legs 100, 101, 102, and 103. The positioning of the first receiving conveyor subsystem 12 relative to any given mounting surface is a matter of convenience. If desired, one end of the first receiving conveyor subsystem 12 may be elevated with respect to its other end to facilitate the loading and processing of the farm product 22, FIG. 1a. Preferably, the elevation of one end of the first receiving conveyor subsystem 12 is with respect to the upright back plane 106. The first receiving conveyor subsystem 12 is elevated in such a way as to angularly position the upright back plane 106 with respect to the vertical (90°) center line of the present invention 10.

Typically, this positional angle is in the range of 90° to about 145° (degrees) from the vertical.

The First Conveyor Thrasher Subsystem

The first conveyor thrasher subsystem 13, FIG. 2a comprises a frame mounted conveyor 108. The frame mounted conveyor 108 may, if desired, be mounted to one end of the first receiving conveyor subsystem 12. Preferably, the frame mounted conveyor 107 is securely mounted to the end opposite from the upright back plane 106. The other end of the frame mounted conveyor 108 has a pair of ground engaging legs 109 and 110 that support, in part, the weight of the frame mounted conveyor 108. A pair of supporting sidewalls 40 and 41, FIG. 4a are secured to the frame mounted conveyor 108. The pair of upright sidewalls 40 and 41 provides structural support to the frame mounted conveyor 108. The sidewalls 40 and 41 facilitate and contain the farm product 22 when the present invention 10 is in operation. The conveyor portion of the frame mounted conveyor 108 is a continuous chain driven conveyor that has a plurality of slats 50, FIG. 1b, mounted parallel to the direction of travel of the conveyor.

The first conveyor thrasher subsystem 13 may be fabricated from any convenient material that supports the operation of the present invention 10. If desired, one end of the first conveyor thrasher subsystem 13 may be elevated with respect to its other end to facilitate the processing of the farm product 22, FIG. 1a. Preferably, the elevation of one end of the first conveyor thrasher subsystem 13 is with respect to the first receiving conveyor subsystem 12. The angle of elevation is derived from empirical means that allow the farm product 22 to be processed.

The Platform Conveyor Subsystem

The platform conveyor subsystem 14, FIG. 2a comprises a frame mounted conveyor 110. The frame mounted conveyor 110 may, if desired, be adjacently mounted to one end of the first conveyor thrasher subsystem 13 or mounted to the first receiving conveyor 12. Preferably, the frame mounted conveyor 110 is securely mounted to the end of the conveyor frame 108 opposite the first receiving conveyor subsystem 12. The positioning of the platform conveyor 14 in relation to the first conveyor thrasher subsystem is a matter of convenience. The platform conveyor subsystem 14 may, if desired, be mounted at a right angle to the first conveyor thrasher subsystem 13. The frame mounted conveyor 110 may, if desired, have a plurality of ground engaging legs (not shown) that support, in part, the weight of the frame mounted conveyor 110. A pair of supporting upright sidewalls are secured to the frame mounted conveyor 110. The sidewalls 40 and 41 facilitate and contain the farm product 22 when the present invention 10 is in operation. The conveyor portion of the frame mounted conveyor 110 is a continuous chain driven conveyor that has a plurality of slats 50, FIG. 1b, mounted parallel to the direction of travel of the conveyor. The platform subsystem 14 may be fabricated from any convenient material that supports the operation of the present invention 10.

The Standard Baler

The standard baler 11 may, if desired, be any type of baling mechanism that receives the farm product 22 from the platform conveyor subsystem 14 and transforms or bales that farm product 22 into suitably sized bales. The size of the bales is a matter of convenience and may range in size depending on the intended storage and transportation of the baled farm product 22. A typical example of a standard baler 11 is manufacture by John Deere Model 348.

The Second Receiving Conveyor Subsystem and the Second Conveyor Thrasher Subsystem The second receiving conveyor subsystem 15, FIG. 2a is a mirror image of the first receiving conveyor subsystem 12. The mounting or positioning of the second receiving conveyor subsystem 15 may, if desired, be identical to and oppositely spaced from the position or mounting of the first receiving conveyor subsystem 12. The second conveyor thrasher subsystem 16 is a mirror image of the first conveyor thrasher subsystem 13. The mounting or positioning of the second conveyor thrasher subsystem 16 may, if desired, be identical to and oppositely spaced from the position or mounting of the first conveyor subsystem 13. The second receiving conveyor 15 and the second conveyor thrasher 16 provide additional processing support for the farm product 22, i.e., baled farm product 22 may be loaded into the first receiving conveyor 12 and the baled farm product 21 may be loaded onto the second receiving convey 15.

In operation the above discussed present invention 10 has an operator 23, positioned at the system controls 19, that commands the first receiving conveyor subsystem 12 to begin moving or unfurling the farm product 22. The unfurled farm product is conveyed to the first conveyor thrasher subsystem 13 where it is thrashed to further unfurl the farm product 22. The operator 23 may, if desired, manipulate the system controls 19 to actively change the conveying motion of the subsystems 12 and 13 from the forward to a reverse direction to aid in the unfurling of the farm product 22.

The unfurled farm product 22 is gravity fed to the platform conveyor 14 where the farm product 22 is baled by the standard baler 11. The platform conveyer subsystem 14, as the other subsystems disclosed herein may be commanded or operated in the forward or reverse directions by the operator 23 to aid in the baling of the farm product 22. After baling, the standard baler 11 ejects the baled farm product 22 from the baler to be loaded onto awaiting vehicles or stacked near by.

Any number of the above discussed subsystems of the present invention 10 may be ganged in series or connected in parallel to bale multiple bales of farm product. If desired a single operator 23 may be positioned at the controls 19 to operate any combination of the multiple subsystems of the present invention 10. An example of multiple farm product baling is a second receiving conveyor 15 suitably positioned in relation to the conveyor platform 14. This position may, if desired, be aligned with the first receiving conveyor 12. The second receiving conveyor subsystem 15 is mechanically connected to a second conveyor thrasher subsystem 16. The second conveyor thrasher subsystem 16 is mechanically connected to a conveyor platform subsystem 14.

If desired, the farm product 21 is retrieved from storage by a farm vehicle or tractor 20. The tractor 20 suitably positions the farm product 21 into the second receiving conveyor subsystem 15. The operator 23, positioned at the system controls 19, commands the second conveyor subsystem 15 to begin moving or unfurling the farm product 21. The unfurled farm product is conveyed to the second conveyor thrasher subsystem 16 where it is thrashed to further unfurl the farm product 21. The operator 22 may, if desired, manipulate the system controls 19 to actively move the conveying motion of the subsystems 15 and 16 in the forward and reverse directions to aid in the unfurling of the farm product 21.

The unfurled farm product 21 is gravity fed to the platform conveyor 14 where the farm product 21 is baled by the standard baler 11. After baling, the standard baler 11 ejects the baled farm product 21 from the baler to be loaded onto awaiting vehicles or stacked near by. The baling of the farm products 21 and 22 may, if desired, be identical. The subsystems 15 and 16 are mirror images of subsystems 12 and 13 and they both feed the farm product to the platform conveyor subsystem 14 into the baler 11.

The Re-Circulating Subsystem

A re-circulating subsystem 17, FIG. 1a, may, if desired, be connected to the present invention 10 to alleviate dust and/or particles distributed in or near the operation of the present invention 10. During the normal operation of the present invention 10, farm product particles are generated and may be hazardous to the attending operator's health and destructive to associated machinery.

During the operation of the present invention 10, the farm product 21 or 22 is thrashed to break apart the bales so that the standard baling machine 11 may recombine the farm product 21 or 22 into smaller bales. This thrashing process has by-products of dust, fine grain farm products and other particulate matter. The particulate matter generally falls outside of the baling process ergo the particulate matter is not baled. The re-circulating subsystem 17 is positioned along the longitudinal length of the conveyor platform 14. A blower 33 powered by a motor 32 is connected at one end of a duct system 34. The duct system traverses the length of the conveyor platform 13 and under the baling platform 37. The duct system 34 exits the baling platform 37 and curves towards the conveyor platform 13. Any suitable direction towards the conveyor platform 13 may be used to re-circulate or recycle the particulate matter from the farm product 21 or 22. The particulate matter from the farm product 21 or 22 exits the duct system 34 at 36. The exit point 36 may be positioned anywhere to allow the recycling of the particulate matter from farm product 21 or 22. An example of the optimal positioning of the exit point 36 of the duct system 34 is directly over the adjoining position of the conveyor platform 13 and the standard baler 11. If desired, a second blower 35 may be added to increase the volume of particulate matter exiting the duct system 34. An air intake 39 may also be added to the duct system 34, if desired, to increase the airflow within the duct system 39. The air intake 39 may, if desired, be placed anywhere along the length of the duct system 34. In operation, air is forced along the duct system 34 by blower 33. If desired, selected areas of the duct system 34 are perforated or have sufficient openings to allow particulate farm product matter to either fall into or be vacuumed into the duct works. The second blower 35 adds blowing or vacuuming capacity to the duct works and urges forward the particulate farm product matter within the duct system 34.

The Loading Conveyor Subsystem

A loading conveyor subsystem 18, FIG. 1a, may, if desired, be connected to the present invention 10 to aid in the loading of the baled farm products 21 or 22 onto vehicle 25. The conveyor subsystem 18, FIG. 11a, is a free standing pivotal conveyor with a telescoping adjustable extension 74. One end 76 of the conveyor subsystem 19 is pivotally attached to a pivot plate 77. The pivot plate 77 allows the conveyor subsystem 18 to freely move 180° (degrees) about the pivot plate 77. If desired, the conveyor subsystem 18 may be restricted in movement to an arc formed from one adjacent point on the standard baler 11 to a second point oppositely spaced from the first point. This arcuate movement of the conveyor subsystem 18 allows repositioning of the conveyor during the loading of farm product onto truck 25. An extruded gate 79 is connected adjacent the conveyor end 76 and may, if desired, extend outward from the end 76. The extruded gate 79 receives the bales of farm product from the standard baler 11 and guides the bales towards the incline portion 91 of the conveyor subsystem 18. The incline portion 91 extends upward at a selected angle. The angle of inclination is derived from adjusting the conveyor subsystem 18 by turning the crank 93 attached to upright member 86 to a convenient position relative to the loading vehicle or truck 25.

The other end 83 of the conveyor subsystem 18 is angled relative to the horizontal. The inflection point may, if desired, occur anywhere along the inclined portion 91 of the conveyor subsystem 18. Preferably, the inflection point occurs at 82 wherein the conveyor becomes horizontal with the surface to which the conveyor is mounted. The end portion 83 has a telescoping extension 74, FIG. 11b that may, if desired, be extended outward to facilitate the loading of truck 25. A chain 85 extends from the end portion 83 to end portion 76. The chain 85 has hooks, FIG. 14, that urge the baled farm product up the incline 91 onto the end portion 83. The chain 85 is driven by motor 81 that engages pulley 80 and gear 78.

The upright member 86 is connected to a frame 90 that is connected to the frame of the conveyor subsystem 18. The frame 90, oppositely spaced from the connection point to the conveyor subsystem 18, is attached to a pair of angularly spaced wheels 88 and 89. The wheels 88 and 89 are spaced apart and connectively positioned at any convenient angle relative to each other that allows the conveyor subsystem 18 to be arcuately positioned about the standard baler 11.

The pivot plate 77, FIG. 12a may, if desired, be securely mounted to a stationary block (not shown) such as concrete that supports the static forces imposed on the anchoring pin 96. The conveyor subsystem 18 is mounted in such away that it is free to rotate about the anchoring pin 96. The pivot plate 77, FIG. 12b, has at least two U-shaped connecting members 94 and 95 that are constructed in such a way as to support the weight of the conveyor subsystem 18.

The loading conveyor subsystem 18 is pivotally mounted in relation to the standard baler 11. As baled farm products exits the standard baler 11, they are automatically loaded onto the loading conveyor subsystem 18. The baled farm products 21 or 22 travel a variable inclined ramp to the awaiting vehicle 25. The pivotal motion of the loading conveyor subsystem 18 allows repositioning of the conveyor along the longitudinal length of the vehicle 25. An example of the pivotal positioning of the loading conveyor subsystem 18 is delineated at 26, FIG. 1a wherein it can be observed the vehicle 25 is partially loaded and the loading conveyor subsystem 18 is in position 1. As the operator 24 continues to load bales of the farm products 21 or 22 onto the vehicle 25, the loading conveyor subsystem 18 moves, FIG. 1b, to accommodate the changing volume of the load.

In operation, the conveyor subsystem 18 has one end that adjacently abuts the exit port of the standard baler 11. The other end of the conveyor subsystem 18 is pivotally positioned to extend into the bed of the loading truck 25. The bales of farm product exit the standard baler 11 onto a horizontally abutting conveyor 75, FIG. 1a. Once the baled farm product is positioned on the conveyor 75, it is urged forward towards the conveyor subsystem 18, FIG. 11a. The farm product engages the extruded gate 79 and is guided up the incline 91 by the chain 85 and the motor 81. The bales of farm product engage the telescoping platform 74 and are loaded onto truck 25 by operator 24.

The frame 90 of FIG. 13 has a crossbar 100 that has connected at one end a U-shaped member 99. The U-shaped member 99 is secured to the crossbar 100 in such a way as to allow the U-shaped member 99 to pivot in a 180° (degree) arc about the end of the crossbar 100. The frame 99 has a second U-shaped member 98 connected to and oppositely spaced from the first U-shaped member 99. The U-shaped member 98 is secured to the crossbar 100 in such a way as to allow the U-shaped member 98 to pivot in a 180° (degree) arc about the end of the crossbar 100. The wheels 89 and 88 are mounted onto the respective U-shaped members 98 and 99. The wheels 88 and 89, in concert with their respective the U-shaped members 98 and 99 allow the conveyor subsystem 18 to be arcuately positioned about one end of the standard baler 11.

In operation, the conveyor subsystem 18 may, if desired, be physically moved to facilitate the loading of the truck 25. The conveyor subsystem 18 has one end 76 pivotally connected to plate 77. The other end of the conveyor subsystem 18 is free to rotate via the pivot mounted wheels 88 and 89. When the conveyor subsystem 18 is physically moved, the wheels 88 and 89 gradually pivot in the direction of the arc formed by the movement.

Operational Control of the Present Invention

The present invention 10, FIG. 2a, has a plurality of driving or propelling mechanisms attached or connected to the various conveyors that provide the movement for the conveyors. Any number of driving or propelling mechanisms may be used in conjunction with the normal operation of the present invention 10 to allow it to operate normally. The driving or propelling mechanisms may, if desired, be electrical, mechanical, hydraulic or any other suitable form of power that allow the present invention 10 to operate normally. An example of a motor used in the normal operation of the present invention 10 is a first drive motor 28 connected intermediate the first receiving conveyor subsystem 12 and the first conveyor thrasher subsystem 13. The first drive motor 28 provides the power to move its respective conveyors in the forward and reverse directions. Another example of a motor used in the normal operation of the present invention 10 is a second drive motor 29 connected to the thrasher of the first conveyor thrasher subsystem 13. This particular drive motor 29 provides the forward and reverse power to the thrasher to further unfurl the farm product 22. If more than one grouping of subsystems (as discussed above) are utilized by the present invention 10, subsequent motors 30 and 31 may be added.

Figure 2B:
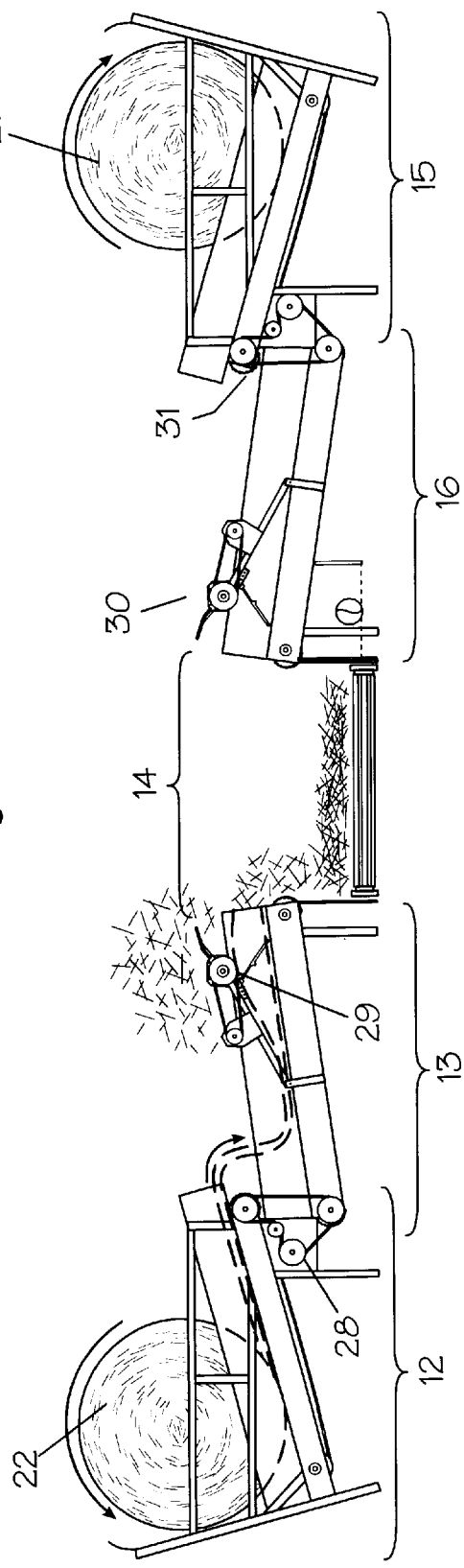
Figure 3:
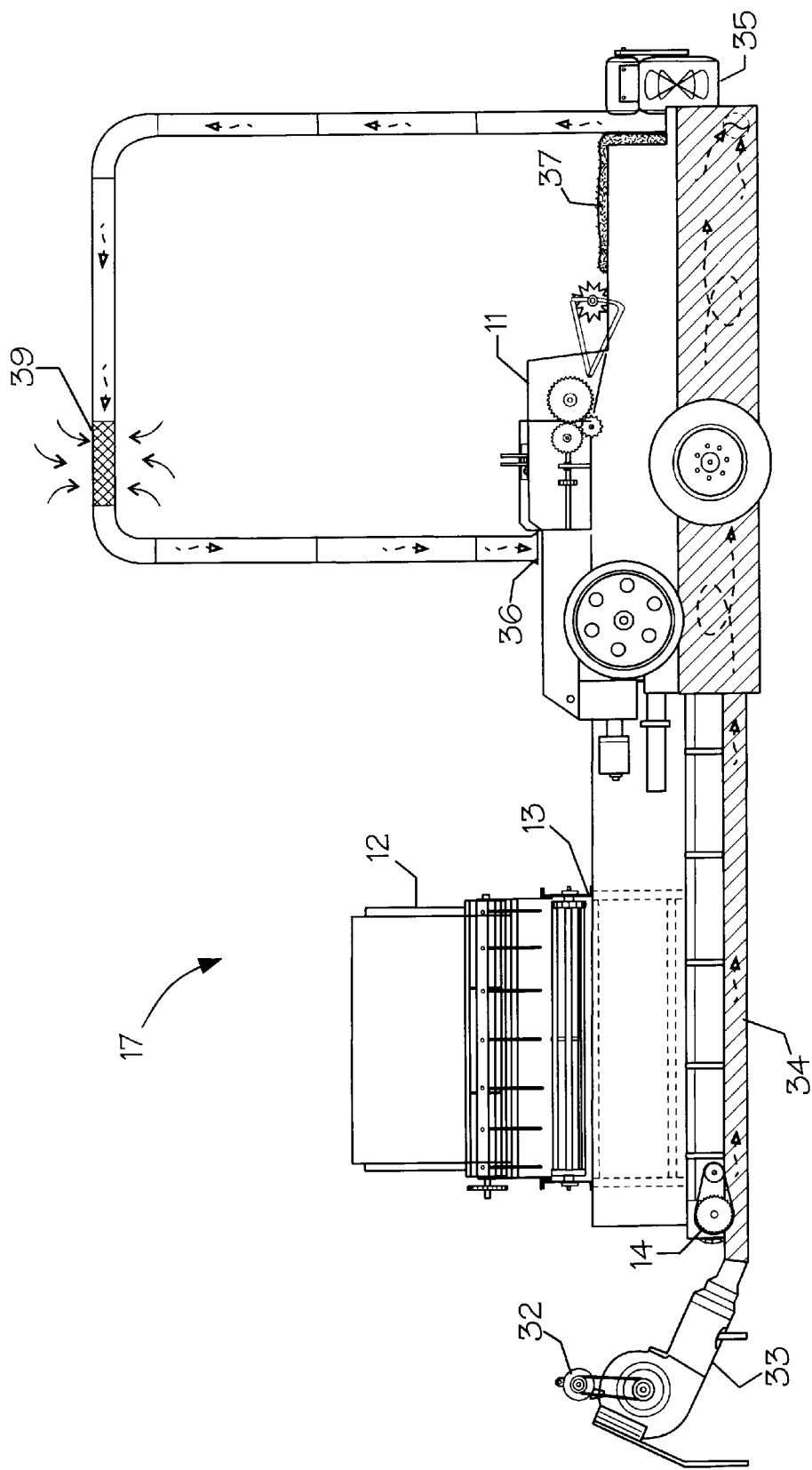

In operation, the unloaded present invention 10, FIG. 2a is positioned on any convenient surface that allows for normal operation. The farm product 22, FIG. 2b is placed in the first receiving conveyor 12. The operator 23 commands drive motor 28, via the controls 19, to rotate the conveyor 12 in a desired direction. The operator 23 may also command the drive motor 28 to rotate the conveyor in a clockwise or counter clockwise direction. In fact, the operator 23 may command the drive motor 28 to alternate between a forward clockwise direction and the reverse counter clockwise direction of rotation. The farm product 22 unrolls due to the conveyor urging the farm product 22 in a forward or reverse direction, and small portions or layers of the farm product 22 begin traversing the longitudinal length of the first conveyor thrasher subsystem 12.

The first conveyor thrasher subsystem 13, FIG. 4a, has a slated conveyer system 42 (discussed below) that traverse the platform (not shown) suspended between sidewalls 40 and 41. The thrasher 43 is positioned along the convey platform in any convenient position. Preferably, the thrasher 34 is towards the end of the conveyor platform and above one end of the conveyor platform 14. The thrasher 43 is powered by a chain driven hydraulic motor 29. Operatively spaced near or adjacent the hydraulic motor 29 is a hydraulic piston 44 for raising and lowering the thrasher 43. The thrasher 43 has at least one blade 44 positioned along its longitudinal length which is parallel to the surface of the platform 42. The thrasher 43 may, if desired, have any number of blades 44 that allow the present invention 10 to operate. The spacing of the blades is a matter of convenience. The blades may be spaced close together or at any separated reasonable distance. At least one prong 45 is positioned along blade 44 to separate or thrash the farm product 21 or 22. If desired, a plurality of prongs 45 may be connected along any number of blades 44 that allow the present invention 10 to operate. Preferably, only one row of prongs 45 is positioned along one blade 44. A reinforcement member 46 may, if desired, be connected to the prong 45 and the blade 44 to provide stability to the prong 45 in relation to the blade 44.

In operation, the first conveyor thrasher subsystem 13, FIG. 4a, conveys the farm product towards the thrasher 43. The thrasher 43 may be rotating in a forward or reverse direction, depending on the operator's 23 desire, to thrash the farm product 21 or 22. The operator 23 may, if desired, position the thrasher in a first position 47, i.e., the thrasher 43 in the maximum down position. The operator 23 may, if desired, position the thrasher in a second position 48, FIG. 4b, i.e., the thrasher 43 in the maximum up position. The operator may also select any thrasher position intermediate the first position 47, FIG. 5a, and the second position 48, FIG. 5b. The relative positioning of the thrasher 13 allows for the relative volume or quantity of farm product 21 or 22 approaching or disposed within the thrasher 43.

The first receiving conveyor subsystem 12, FIG. 6a, and the first conveyor thrasher subsystem 13 each have, in part, at least one slat 50 connected to their respective chain drives 51. Any number of slats may be connected to the chain drive 51 that allows the present invention 10 to operate normally. All of the various chain driven subsystems of the present invention 10 have slats implemented thereon to transport the farm product 21 or 22 along their respective conveyors to the standard baler 11. The slats 50 are mounted in such way that they traverse the surface of the platform 49. In this particular case, platform 49 is associated with the first conveyor thrasher subsystem 13 but subsystems 12, 14, 15, 16 all have associated platforms, chain drives, and slats. The spacing 51 of the slats 50, FIG. 6b, is a matter of convenience. The slats 50 may be positioned adjacent to one another, or they may be spaced at any random distance from one another.

In operation, the farm product 21 or 22 is positioned within the confines of the first receiving conveyor subsystem 12. The operator 23 commands the forward motion of the first receiving conveyor subsystem 12. The slats 50 begin to unfurl or unroll the farm product 21 or 22. The positioning of the slats 50 may, if desired, differ between the subsystems 12 and 13 to facilitate the unfurling of the farm product 21 or 22. The operator 23 may, if desired, command the forward or reverse directional motion of the slats 50 thus enabling the unfurling of the farm product 21 or 22.

The present invention 10 utilizes various chain drives that are powered by hydraulic motors. In fact, any type of motor and associated chain drive system may be implemented that allows the present invention 10 to operate normally. An example of a hydraulic motor and associated chain drive is illustrated at 52, FIG. 7a. This particular hydraulic motor and associated chain drive 52 provides the operational power to the conveyor platform 14. The hydraulic motor and associated chain drive system 52 have at least one gear 53, FIG. 7b, mounted on the spindle of the hydraulic motor and the gear is in line with a second gear 54 mounted on a sprocket connected to the frame of the conveyor platform 14. The chain 55 engages the gears 53 and 54, which engage the chain, drive 51. The chain drive 51 traverses the length of the platform of the conveyor platform 14 and engages a second sprocket 56 enabling the attached slats 50 to propel the farm product 21 or 22 in the forward or reverse direction. The gear ratio between the gears 53 and 54 may be any convenient number that allows the present invention 10 to operate normally. Preferably, the gear ratio is 1:1.

Figure 8:
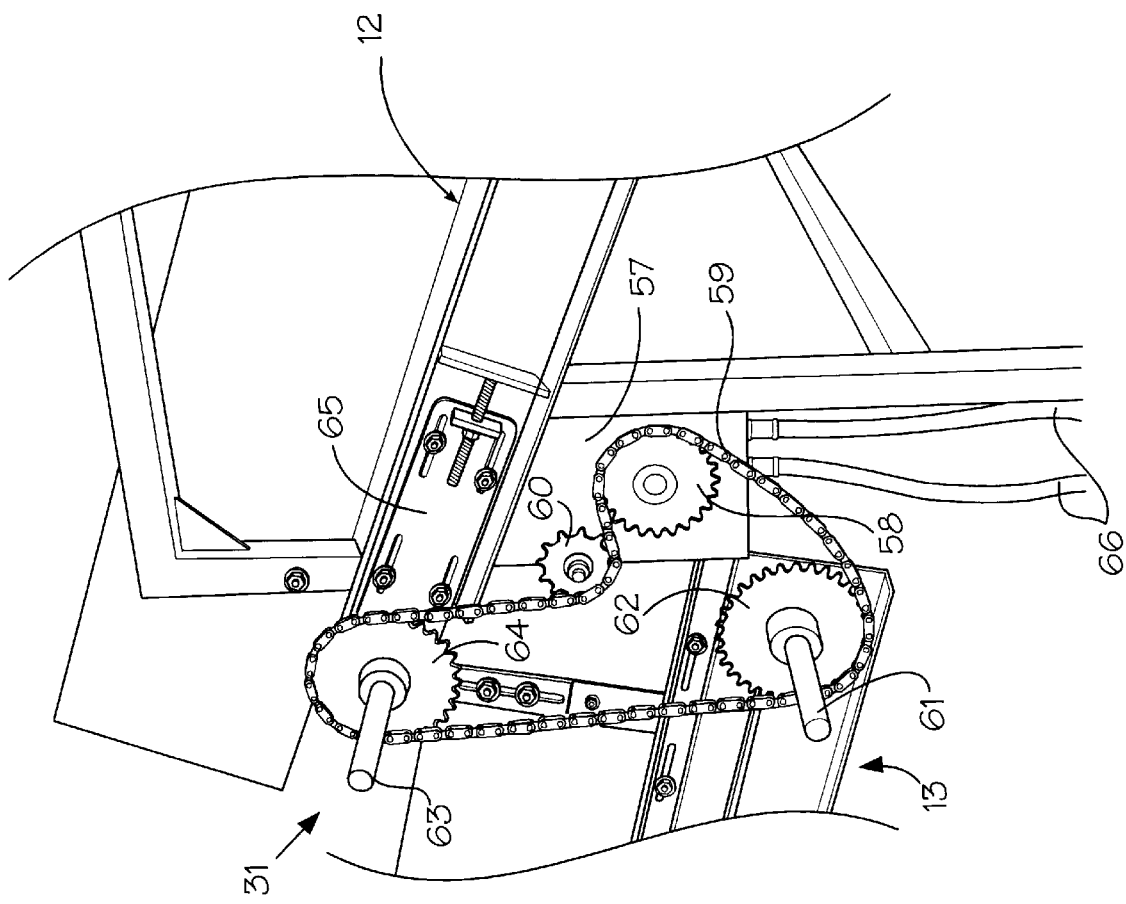
FIG. 8 illustrates a sectional perspective view of the chain drive of FIG. 1a, FIG. 9 illustrates a sectional side view of hydraulic power system of FIG. 1a, FIG. 10 illustrates a schematic diagram of the hydraulic controls of FIG. 9.

Another Example of one of the many hydraulic motor and chain drive assembles that propel the farm product 21 or 22 in the forward or reverse direction is illustrated at 31, FIG. 8. The hydraulic motor and chain drive assembly 31 is mounted between the first receiving conveyor subsystem 12 and the first conveyor thrasher subsystem 13. The hydraulic motor portion 57 may, if desired, be mounted to the frame of the first receiving conveyor subsystem 12. A gear 58 is mounted onto the motor 67 providing suitable transfer of power from the motor 57 to the intended subsystem. A gear 64 is mounted onto a spindle 63, which is mounted onto a gear adjusting assembly 65. The spindle 63 is connected to the chain drive and slats 50 of the first receiving conveyor subsystem 12. If desired the adjusting assembly may tighten or loosen the tension of the chain 59. A fourth gear 60 may, if desired, be connected to the housing of motor 57. This gear engages the chain 59 at a selected point to enhance the movement of the chain 59 about the above discussed gears 59, 62, and 64. The gear ratio between all the discussed gears may be of any value that allows the present invention 10 to operate normally. Preferably, the ratio is 1:1. The selection of the exact position of the adjusting assembly 65 is derived from empirical means and may be adjusted during the operation of the present invention 10. A pair of hydraulic hoses 66 connects the motor 57 and the control system 19 of the present invention 10. The operator 23, by manipulating the controls 19, commands the forward and reverse directions of the discussed motors via hoses 66.

The system controls 19 are operationally connected to all of the hydraulic motors discussed herein via a plurality of hoses. One set of controls and hydraulic hoses 67, FIG. 10, are dedicated to controlling the first receiving conveyor subsystem 12 and the first conveyor thrasher subsystem 13. A second set of controls and hoses 68 are dedicated to controlling the second receiving conveyor subsystem 15 and second conveyor thrasher subsystem 16. The actual number of hoses 67 or 68 that are implemented in the present invention 10 may vary depending on the desired inclusion of hydraulic motors employed. An example of the operational connection of the hose grouping 67 is illustrated in FIG. 9. The hose grouping 67 is operationally connected to the first platform conveyor 13.

The control system 19, FIG. 10, has at least one lever to control the operation of the present invention 10. If desired, the control system 19 may have a plurality of levers 69, 70, 71, and 72 each controlling separate operational functions of the present invention 10. A switching bar 73 is provided to switch the operational control between the first receiving conveyor subsystem 12 and the second receiving conveyor subsystem 15. The switching bar 73 also switches operational control from the first conveyor thrasher subsystem 13 with the second conveyor thrasher subsystem 16. Since the subsystems 12 and 13 are mirror images of subsystems 15 and 16, the switching bar 73 allows the operational controls to be switched between respective subsystems.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together whereas a screw employs a helical surface, in the environment of fastening wooden parts, a nail and a screw may be equivalent structures.

What is claimed is:

1. A farm product baling system, wherein the baling system being operationally connected to a baling machine, comprising:

a) a first conveyor thrasher subsystem operationally connected to the baling machine;

b) said first conveyor thrasher subsystem receiving the farm product, said first conveyor thrasher receiving operational commands for thrashing the farm product;

c) the baling machine receiving the thrashed farm product from the said first conveyor thrasher subsystem;

thereby the baling machine transforms the thrashed farm product into suitably sized bales of farm product.

2. A farm product baling system as recited in claim 1 further comprising:

d) a platform conveyor subsystem disposed intermediate said first conveyor thrasher subsystem and the baling machine;

thereby said platform conveyor subsystem receives and transports said thrashed farm product to the baling machine.

3. A farm product baling system as recited in claim 2 further comprising:

e) a first receiving conveyor subsystem operationally disposed to said first conveyor thrasher subsystem;

f) said first receiving conveyor subsystem receiving operational commands for unfurling the farm product;

thereby said first receiving conveyor unfurls the farm product prior to being thrashed by said first conveyor thrasher subsystem.

4. A farm product baling system as recited in claim 3 further comprising:

d) a second conveyor thrasher subsystem operationally disposed to said conveyor platform subsystem;

e) said second conveyor thrasher receiving operational commands for thrashing the farm product;

thereby the baling machine transforms the thrashed farm product into suitably sized bales of farm product.

5. A farm product baling system as recited in claim 4 further comprising:

e) a second receiving conveyor subsystem operationally disposed to said second conveyor thrasher subsystem;

f) said second receiving conveyor subsystem receiving operational commands for unfurling the farm product;

g) means for switching operational control between the combination of said first conveyor thrasher subsystem and said first receiving conveyor subsystem and the combination of said second conveyor thrasher subsystem and said second receiving conveyor subsystem;

thereby the farm product is thrashed and conveyed to said platform conveyor subsystem by the combination of said first conveyor thrasher subsystem and said first receiving conveyor subsystem or by said second conveyor thrasher subsystem and said second receiving conveyor subsystem.

6. A farm product baling system as recited in claim 5 wherein said first conveyor thrasher subsystem having at least one slat operationally disposed thereon.

7. A farm product baling system as recited in claim 6 wherein said platform conveyor having at least one slat operationally disposed thereon.

8. A farm product baling system as recited in claim 7 wherein said second conveyor thrasher subsystem having at least one slat operationally disposed thereon.

9. A farm product baling system as recited in claim 8 wherein said first conveyor thrasher subsystem having a first conveyor assembly operationally disposed thereto and a first thrashing assembly operationally disposed at one end of said first conveyor assembly, said first thrashing assembly having at least one blade operationally disposed thereon, said blade being disposed in an operational relationship with said first conveyor assembly.

10. A farm product baling system as recited in claim 9 wherein the farm product baling system having at least one means for providing operational power.

11. A farm product baling system as recited in claim 10 wherein said means is a hydraulic motor.

12. A farm product baling system as recited in claim 11 wherein said blade having at least one prong operationally disposed thereon.

13. A farm product baling system as recited in claim 12 wherein said first conveyor assembly receiving an operational command to traverse the farm product in a forward direction along said first conveyor assembly.

14. A farm product baling system as recited in claim 13 wherein said first conveyor assembly receiving an operational command to traverse the farm product in a reverse direction along said first conveyor assembly portion.

15. A farm product baling system as recited in claim 14 wherein said first thrasher assembly receiving an operational command to thrash the farm product in a forward direction.

16. A farm product baling system as recited in claim 15 wherein said first thrasher assembly receiving an operational command to thrash the farm product in a reverse direction.

17. A farm product baling system as recited in claim 16 wherein said first thrashing assembly receiving an operational command to traverse to a selected operational thrashing position above said first conveyor assembly.

18. A farm product baling system as recited in claim 17 wherein said second conveyor thrasher subsystem having a second conveyor assembly operationally disposed thereto and a second thrashing assembly operationally disposed at one end of said second conveyor assembly, said second thrashing assembly having at least one blade operationally disposed thereon, said blade being disposed in an operational relationship with said second conveyor assembly.

19. A farm product baling system as recited in claim 18 wherein said blade having at least one prong operationally disposed thereon.

20. A farm product baling system as recited in claim 19 wherein said second conveyor assembly receiving an operational command to traverse the farm product in a forward direction along said second conveyor assembly.

21. A farm product baling system as recited in claim 20 wherein said second conveyor assembly receiving an operational command to traverse the farm product in a reverse direction along said second conveyor assembly.

22. A farm product baling system as recited in claim 21 wherein said second thrasher assembly receiving an operational command to thrash the farm product in a forward direction.

23. A farm product baling system as recited in claim 22 wherein said second thrasher assembly receiving an operational command to thrash the farm product in a reverse direction.

24. A farm product baling system as recited in claim 23 wherein said second thrasher assembly receiving an operational command to traverse to a selected operational thrashing position above said second conveyor assembly.

25. A farm product baling system as recited in claim 3 further comprising a re-circulating subsystem operationally disposed to the platform conveyor subsystem, said re-circulating subsystem receives unprocessed farm product and re-circulates the farm product to said platform conveyor subsystem.

26. A farm product baling system as recited in claim 25 wherein said re-circulating subsystem having at least one means for operationally re-circulating said unprocessed farm product to said platform conveyor subsystem.

27. A farm product baling system as recited in claim 26 wherein said means is an air blower.

28. A farm product baling system as recited in claim 27 wherein said re-circulating subsystem having at least one port operationally disposed to said re-circulating subsystem.

29. A farm product baling system as recited in claim 28 said port being an air intake port.

30. A farm product baling system as recited in claim 1 further comprising:
   d) a loading conveyor subsystem operationally disposed to the baling machine; and
   e) said loading conveyor subsystem operationally receiving the baled farm product;
   f) said loading conveyor subsystem having means disposed thereon for conveying the baled farm product.

31. A farm product baling system as recited in claim 30 wherein said loading conveyor subsystem having one end pivotally disposed in an adjacent operational relationship with the baling machine, said loading conveyor subsystem having a second end oppositely spaced from said first end.

32. A farm product baling system as recited in claim 31 wherein said second end being selectively elevated vertically in relation to said first end.

33. A farm product baling system as recited in claim 32 wherein said second end having a portion thereof being selectively angled horizontally with respect to the vertical of said elevated second end.

34. A farm product baling system as recited in claim 33 wherein said loading conveyor subsystem having a telescoping extension member operatively disposed to said angled end.

35. A farm product baling system as recited in claim 34 wherein said telescoping extension member being outwardly extendable.

36. A farm product baling system, the baling system being operationally connected to a baling machine wherein the baling machine receives thrashed farm product and transforms that farm product into suitably sized bales, comprising:

a) a first receiving conveyor subsystem operationally connected to a first conveyor thrasher subsystem;

b) a platform conveyor subsystem operationally connected to said first conveyor thrasher subsystem and the baling machine;

c) said first receiving conveyor subsystem receiving the farm product, said first receiving conveyor subsystem processing the farm product;

d) said first receiving conveyor subsystem operationally conveys said processed farm product to said first conveyor thrasher subsystem;

e) said first conveyor thrasher subsystem further processing the farm product;

f) said first conveyor thrasher subsystem operationally conveys said processed farm product to said platform conveyor subsystem;

g) said platform conveyor conveys the processed farm product to the baling machine;

h) a second receiving conveyor subsystem operationally connected to a second conveyor thrasher subsystem;

i) said second conveyor thrasher subsystem operationally connected to said platform conveyor subsystem;

j) said second receiving conveyor subsystem receiving the farm product, said second receiving conveyor subsystem processing the farm product;

k) said second receiving conveyor subsystem operationally conveys said processed farm product to said second conveyor thrasher subsystem;

l) said second conveyor thrasher subsystem further processing the farm product;

m) said second conveyor thrasher subsystem operationally conveys said processed farm product to said platform conveyor subsystem;

n) the baling machine receiving the processed farm product;

o) means for switching operational control between the combination of said first conveyor thrasher subsystem and said first receiving conveyor subsystem and the combination of said second conveyor thrasher subsystem and said second receiving conveyor subsystem;

thereby the baling machine transforms the thrashed farm product into suitably sized bales.

* * * * *